Oct. 31, 1961   L. S. FITE   3,006,655
WEIGHT DISTRIBUTING TRUCK BED ATTACHMENT
Filed June 11, 1959   2 Sheets-Sheet 1
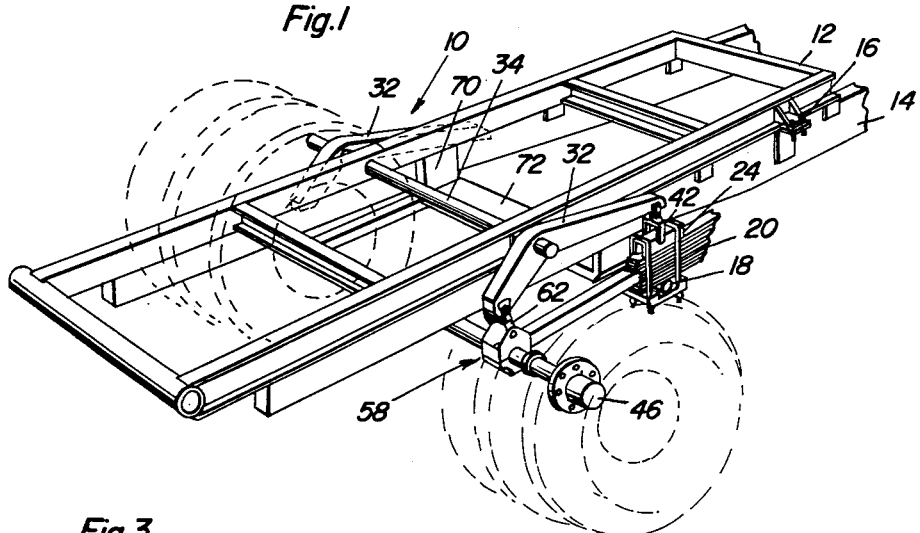
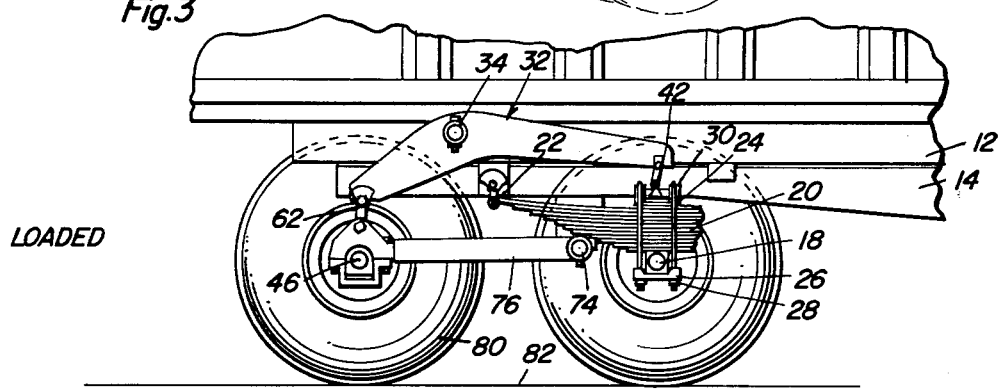
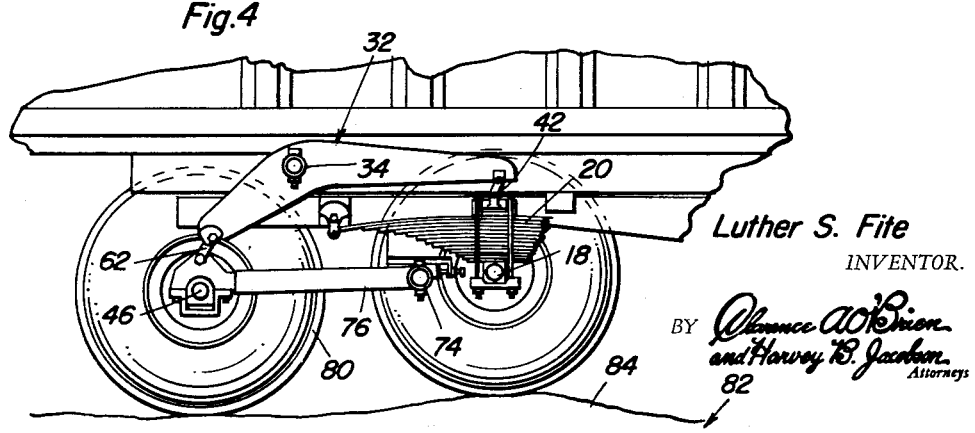
Luther S. Fite
INVENTOR.

Oct. 31, 1961    L. S. FITE    3,006,655
WEIGHT DISTRIBUTING TRUCK BED ATTACHMENT
Filed June 11, 1959    2 Sheets-Sheet 2

Luther S. Fite
INVENTOR.

BY
Attorneys

United States Patent Office 3,006,655
Patented Oct. 31, 1961

3,006,655
WEIGHT DISTRIBUTING TRUCK BED ATTACHMENT
Luther S. Fite, Natchez, Miss., assignor to Natchez Steel Products Company, Inc., Natchez, Miss., a corporation of Mississippi
Filed June 11, 1959, Ser. No. 819,619
7 Claims. (Cl. 280—104.5)

This invention relates generally to a truck attachment and more particularly to a novel truck bed construction adapted to be bolted to a truck frame without mutilation thereof. The invention relates generally to an equalizing arrangement or device between a live or driving axle and an auxiliary or towed axle. The auxiliary or towed axle is pivotally attached to an elongated truck bed which in turn is bolted to the truck frame. The apparatus is designed and constructed so that the auxiliary or towed axle and wheels carried thereby, and live or driving axle and wheels carried thereby will share the weight load carried by the truck bed after the weight load on the truck bed exceeds a predetermined amount. When the load is removed from the truck bed, the drive axle original equipment leaf springs raise the truck frame causing the auxiliary or towed axle to raise so that the wheels carried thereby may ride free of the highway on empty trips of the truck.

The particular improvements presented in this application relate generally to the same subject matter disclosed in prior Patent No. 2,943,865 and the improvements thereover lie in the improved weight distribution means and the increased ability of the apparatus to properly operate over uneven terrain.

It is a principal object of this invention to provide a novel truck attachment for automatically distributing the weight load of a truck between a live axle and a towed axle.

It is a more particular object of this invention to provide apparatus for permitting the effective use of a longer truck bed on a small truck than is conventionally used, thereby increasing the pay load, while still meeting the load requirements of State highway authorities with respect to various types of trucks.

It is a further object of this invention to provide apparatus to be utilized in conjunction with conventional trucks whereby the conventional truck may carry an increased pay load without increasing operating expenses therefor.

Other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary perspective view of the truck bed attachment comprising this invention bolted to a conventional truck frame;

FIGURE 3 is a fragmentary side elevational view illustrating the truck bed attachment utilized with the truck bed loaded; and FIGURE 4 is a fragmentary side elevational view of the truck bed attachment riding over uneven terrain with the truck bed loaded.

Figure 2:
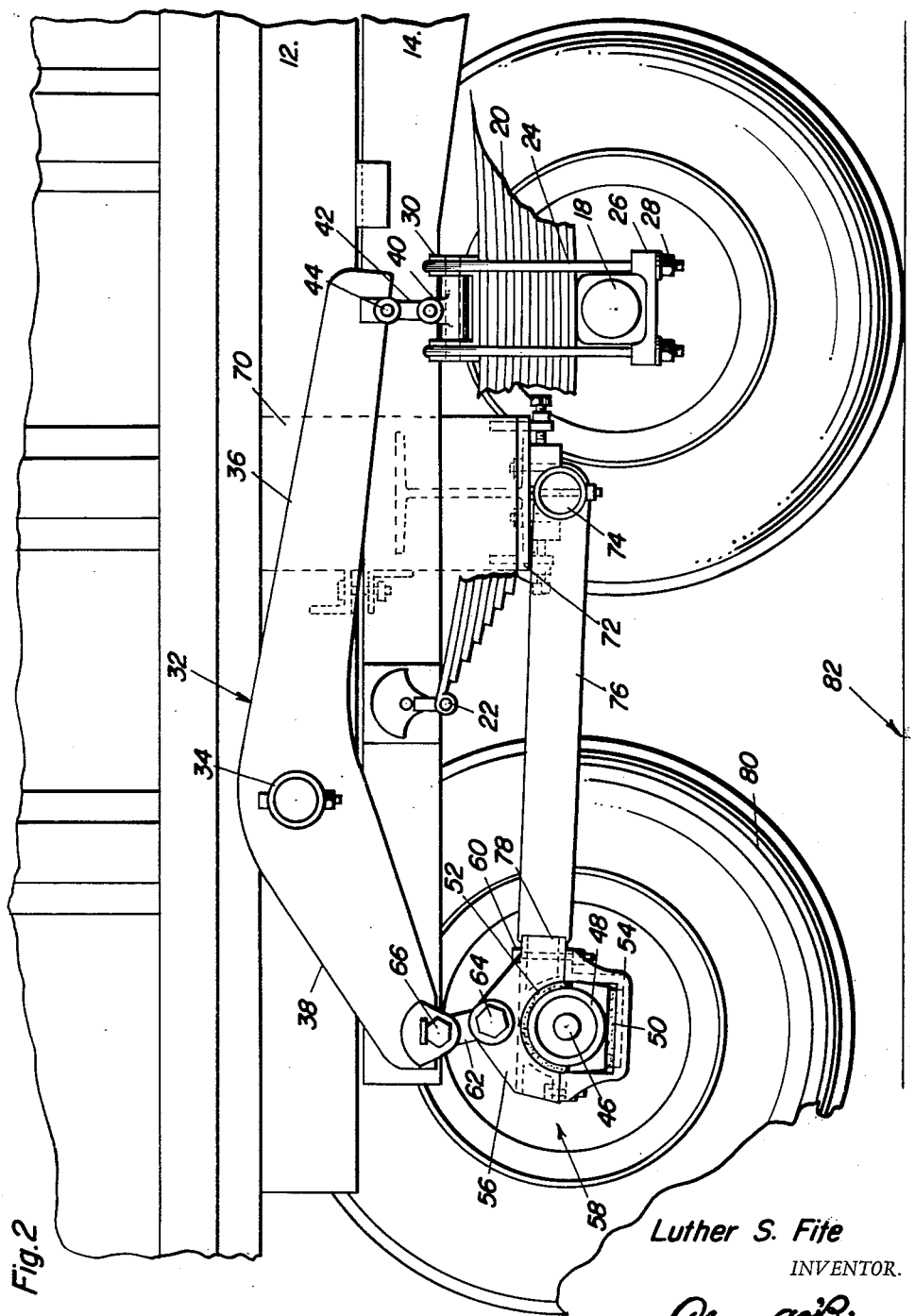
FIGURE 2 is a fragmentary side elevational view illustrating the invention utilized with the truck bed in an unloaded condition.

With continuing reference to the drawings and initial reference to FIGURE 1, numeral 10 generally represents the truck bed attachment including a truck bed 12 adapted to be bolted to a truck frame 14 by bolts 16 securing mating flanges.

The truck including the truck frame 14 is provided with a conventional live axle 18 having original equipment leaf springs 20 hung from shackles 22 beneath the truck frame 14. The springs 20 are secured to the live or drive axle 18 by U-shaped bolts 24 which are received through a lower saddle member 26 and retained by nuts 28 below the drive axle 18. An upper saddle member 30 is received within the U-shaped bolts 24 fixed to the springs 20.

An equalizing bar 32 is pivotally supported from the truck bed 12. A shaft 34 extends through apertures, including bearings therein, on opposed sides of the truck bed 12. Terminally fixed to the shaft 34 externally of the truck bed 12 are the equalizing bars 32. The equalizing bars 32 are formed integrally and include a forwardly extending portion 36 and a rearwardly extending portion 38. It is to be noted that the portions 36 and 38 are formed at an angle to one another. It is also to be noted that the pivot support point 34 is not centrally located on the equalizing bar 32 but is closer to the rear terminal thereof.

Pivotally fixed to a stud 40 on the upper saddle member 30 is a shackle link 42 which is in turn pivotally connected to the forward terminal of the equalizing bar 32 as at 44.

A towed or auxiliary axle 46 is accommodated in an axle housing 48 which is fitted between rubber bushings 50 and 52. The bushings 50 and 52 are seated within depressions formed in mating jaws 54 and 56 of an axle housing clamp member 58. Bolts 60 secure the jaws 54 and 56 of the clamp 58 together. A bifurcated shackle link 62 is pivotally secured to the jaw member 56 at 64 and also terminally and pivotally secured at 66 to the rear terminal of the equalizing bar 32.

A pair of plates 70 extend vertically downward from the truck bed 12 and are connected by a cross-brace member 72. A stub shaft 74 is fixed to the member 72 and a two bar 76 is pivoted thereon. The tow bar 76 extends rearwardly and is welded to the upper jaw member 56 of clamp 58 as at 78.

Though the above recitation has not particularly indicated the presence of the dual inclusion of each of the elements, it will be apparent from FIGURE 1 that the device is symmetrical along a longitudinal axis of the truck and accordingly two equalizing bars 32, two tow bars 76, two clamps 58, etc. will be utilized. It is thought therefore that the constructional features of the invention should now be apparent.

In the utilization of the invention, attention is particularly called to FIGURES 2 through 4. In FIGURE 2, the truck bed 12 is unloaded and accordingly the original equipment springs 20 are bent upwardly so that the truck frame 14 is raised relative to the live axle 18. Accordingly, the truck bed 12 will be elevated and the pivot support point 34 will likewise be elevated. Accordingly, the towed axle 46 will be elevated and the wheel and tire 80 carried thereby will be disengaged from the ground surface 82. It is to be noted in FIGURE 2 that the springs 20 bias the device in a manner such that under no load conditions, the shackle link 42 is vertical while the shackle link 62 is inclined rearwardly. Reiterating, it is stressed that the springs of the live axle 18 are arched downwardly because there is insufficient weight carried by the truck bed 12 to compress them. Inasmuch as the forward terminal of the equalizing bar 32 is attached to the springs 20 and axle 18 by the shackle link 42 and further inasmuch as the equalizing bar pivots on a shaft 34 to the rear of the live axle 18, the rear terminal of the equalizing bar will be in the elevated position indicated. Due to the particular configuration and angle of the equalizing bar 32, both the front and rear shackle links 42 and 62 are positioned at different angles because of the different pivoting centers of the shackle pivot pins.

Attention is now directed to FIGURE 3. As the truck is being loaded, the additional weight in the bed 12 causes the springs 20 to compress, as indicated, and therefore the frame of the truck moves downwardly to a lowered position, causing the equalizer bar 32 to pivot on its shaft 34 whereby the wheels and tires 80 of the towed axle 46 are lowered. Since the equalizing bar 32 pivots at a pivot support point 34 to the rear of the equalizing bar midpoint, greater than 50% of the weight of the truck is carried by the live axle 18 to assure proper traction. After the tires and wheels 80 of the towed axle 46 are on the ground, the additional weight impressed on the truck 12 is distributed proportionally between the towed axle 46 and live axle 18. It is to be noted that when the full load is applied, the equalizing bar 32 has pivoted to a point where the shackle link 62 has moved to a substantially vertical position from its rearwardly inclined position of FIGURE 2. The shackle link 42 remains substantially in a vertical position.

Now referring to FIGURE 4, the action of the equalizing bar 32 is to be noted when the live axle 18 passes over an uneven portion 84 of the ground 82. In order for the live axle 18 and towed axle 46 to ride over the unlevel surface 84 when loaded, the following sequence occurs: When the live axle 18 rides over the obstacle 84, the springs 20 are compressed to a reverse bend, as clearly indicated in FIGURE 4 and the towed axle 46 is forced downwardly by the connecting equalizing bar 32 pivoting on shaft 34. The live axle 18 does not assume all of the weight of the load as it rides over the obstacle 84 because the equalizing bar 32 enables the weight to be distributed proportionately between the live axle 18 and towed axle 46. The equalizing bar pivots at a point 34 to the rear of its mid-point. This construction has been utilized so that the live axle 18 will carry slightly more than 50% of the truck bed weight in order to maintain proper traction. The respective angles of the shackle links 42 and 62 are to be noted in FIG. 4. Both of the shackle links are now apparently inclined forwardly. In essence, it is seen that by providing the designated shackle linkage, the obstacle 84 does not transmit all of the additional load upon the live axle 18 but permits the load to be distributed to the towed axle 46.

It of course will be appreciated that when the truck is unloaded, the towed axle 46 and wheel and tire 80 carried thereby will be lifted from the ground to return to the position indicated in FIGURE 2 for empty return trips of the truck.

From the foregoing, it is felt that one skilled in the art will apparently fully comprehend the structural and operational teachings of the invention.

The foregoing is considered as illustrative only of the principles of the invention. Further, since numerous modifications and changes will readily occur to those skilled in the art it is not desired to limit the invention to the exact construction and operation shown and described, and accordingly all suitable modifications and equivalents may be resorted to, falling within the scope of the invention as claimed.

What is claimed as new is as follows:

1. A truck bed attachment for distributing the weight of a loaded bed over a greater number of wheels than the distributed weight of an unloaded bed comprising in combination with a truck frame having a resiliently suspended live axle, a rigid equalizing bar pivotally supported by said truck bed, first means terminally and pivotally connecting said bar to said live axle, said first means including a shackle having a shackle link, a towed axle, second means terminally and pivotally connecting said bar to said towed axle remote from said live axle, said second means including a shackle link, said resilient suspension associated with said live axle being of sufficient strength to raise said bed when in an unloaded condition relative to said live axle whereby said pivot point between said bar and bed will be raised to elevate said towed axle relative to said live axle, said pivotal support point between said equalizing bar and said truck bed being positioned closer to said second means than said first means whereby the live axle will support greater than 50% of the load when the live axle and towed axle support the load.

2. A truck bed attachment for distributing the weight of a loaded bed over a greater number of wheels than the distributed weight of an unloaded bed comprising in combination with a truck frame having a resiliently suspended live axle, a rigid equalizing bar pivotally supported by said truck bed, first means terminally and pivotally connecting said bar to said live axle, said first means including a shackle having a shackle link, a towed axle, second means terminally and pivotally connecting said bar to said towed axle remote from said live axle, said second means including a shackle link, said resilient suspension associated with said live axle being of sufficient strength to raise said bed when in an unloaded condition relative to said live axle whereby said pivot point between said bar and bed will be raised to elevate said towed axle relative to said live axle, said pivotal support point between said equalizing bar and said truck bed being positioned closer to said second means than said first means whereby the live axle will support greater than 50% of the load when the live axle and towed axle support the load, said equalizing bar including a first portion between said first means and said pivotal support point and a second portion between said second means and said pivotal support point, said first and second portions including an axis interconnecting the pivot point at the ends thereof with the support point for the bar, said axes being angularly related.

3. A truck bed attachment for distributing the weight of a loaded bed over a greater number of wheels than the distributed weight of an unloaded bed comprising in combination with a truck frame having leaf springs dependingly supported therefrom secured to a live axle, a rigid equalizing bar pivotally supported by said truck bed, an upper saddle secured to said leaf springs, a first shackle link pivotally connected between said upper saddle and a first terminal of said equalizing bar, a towed axle, means connecting a second shackle link between said towed axle and a second terminal of said equalizing bar, said leaf spring being of sufficient strength to raise said bed when in an unloaded condition relative to said live axle whereby said pivot point between said bar and bed will be raised to elevate said towed axle relative to said live axle, said pivotal support point between said equalizing bar and said truck bed being positioned closer to said second means than said first means whereby the live axle will support greater than 50% of the load when the live axle and towed axle support the load.

4. A truck bed attachment for distributing the weight of a loaded bed over a greater number of wheels than the distributed weight of an unloaded bed comprising in combination with a truck frame having leaf springs dependingly supported therefrom secured to a live axle, a rigid equalizing bar pivotally supported by said truck bed, an upper saddle secured to said leaf springs, a first shackle link pivotally connected between said upper saddle and a first terminal of said equalizing bar, a towed axle, means connecting a second shackle link between said towed axle and a second terminal of said equalizing bar, said leaf spring being of sufficient strength to raise said bed when in an unloaded condition relative to said live axle whereby said pivot point between said bar and bed will be raised to elevate said towed axle relative to said live axle, said pivotal support point between said equalizing bar and said truck bed being positioned closer to said second means than said first means whereby the live axle will support greater than 50% of the load when the live axle and towed axle support the load, said equalizing bar including a first portion between said first means and said pivotal support point and a second portion between said second means and said pivotal support point, said first and second portions including an axis interconnecting the pivot point at the ends thereof with the support point for the bar, said axes being angularly related.

5. A truck bed attachment for distributing the weight of a loaded bed over a greater number of wheels than the distributed weight of an unloaded bed comprising in combination with a truck frame having leaf springs dependingly supported therefrom secured to a live axle, a rigid equalizing bar pivotally supported by said truck bed, an upper saddle secured to said leaf springs, a first shackle link pivotally connected between said upper saddle and a first terminal of said equalizing bar, a towed axle, means connecting a second shackle link between said towed axle and a second terminal of said equalizing bar, said pivotal support point between said equalizing bar and said truck bed being positioned closer to said second means than said first means whereby the live axle will support greater than 50% of the load when the live axle and towed axle support the load, said equalizing bar including a first portion between said first means and said pivotal support point and a second portion between said second means and said pivotal support point, said first and second portions including an axis interconnecting the pivot point at the ends thereof with the support point for the bar, said axes being angularly related, said leaf springs normally biased for urging said truck bed and equalizing bar connected thereto upwards relative to said live axle for lifting said towed axle vertically higher than said live axle whereby said second shackle link will normally incline rearwardly, said first shackle link normally extending vertically.

6. The combination of claim 5 wherein said means connecting said second shackle link to said towed axle includes a clamp, said towed axle securely received in said clamp.

7. The combination of claim 6 including a rigid tow bar pivotally secured between said truck bed and said clamp.

References Cited in the file of this patent
UNITED STATES PATENTS

| | | |
|---|---|---|
| 1,908,751 | Gurney | May 16, 1933 |
| 2,017,001 | Hocking | Oct. 8, 1935 |
| 2,721,405 | Gardner | Oct. 25, 1955 |
| 2,943,865 | Fite | July 5, 1960 |